United States Patent Office 3,322,791
Patented May 30, 1967

3,322,791
PREPARATION OF OPTICALLY ACTIVE LACTIDES
Stanley Selman, Wilmington, Del., assignor, by mesne assignments, to Ethicon, Inc., a corporation of New Jersey
No Drawing. Filed Sept. 26, 1963, Ser. No. 311,668
3 Claims. (Cl. 260—340.2)

The present invention relates to the preparation of optically active cyclic dimers of a α-hydroxy acids, and, more particularly, to the preparation of optically active lactides, i.e., cyclic esters of α-hydroxypropionic acid which have the formula

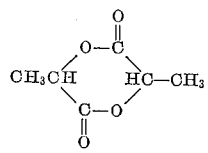

In accordance with the present invention, the two optically active enantiomorphs of lactic acid are converted into the corresponding optically active lactide enantiomorphs, i.e. L(+) lactic acid is converted into L(−) lactide and D(−) lactic acid is converted into D(+) lactide, by heating in the presence of a titanium alkoxide.

Although other amphoteric metal alkoxides also exhibit catalytic activity in converting optically active lactic acid to optically active lactides, titanium alkoxides are greatly preferred because of the high yield of the optically active lactide obtained therewith. The length of alkoxide groups attached to the titanium is not critical, although alkoxide groups containing more than twelve carbon atoms are generally not employed.

The process is carried out by heating the optically active lactic acid, which may also be in the form of a concentrated aqueous solution, at a temperature of 100° C. to 250° C. in the presence of 0.01 to 5 weight percent of a titanium alkoxide, based on the lactic acid present, for sufficient length of time to allow the esterification; i.e. the evolution of the theoretical amount of water from the reaction medium. The product is recovered by low pressure distillation.

The invention is further illustrated by the following examples.

Example I

A 40 percent solution of L(+) lactic acid, 500 g., is concentrated under vacuum in an oil bath maintained at 40° C. until 270 to 290 g. of water has been removed. Tetraisopropyl titanate, 0.5 weight percent, is added and the reaction mixture is heated rapidly to 150 to 175° C. at 100 mm./Hg pressure. This temperature is maintained for 30 to 45 minutes until the theoretical amount of water of dehydration has been removed through a 10 inch Vigreux column. The column is then replaced by a short "goose-neck," the pressure is reduced to 1–2 mm. and the residue is distilled with no fractionation. The faintly yellow, semisolid distilate is filtered, the residue is ground in a mortar and washed by stirring with cold water. This operation is repeated until the aqueous filtrate is no longer colored. The resulting white solid, M.P. 92 to 97° C., is then recrystallized twice from boiling carbon tetrachloride to give 100.6 g. (60 percent yield) of L(−) lactide int he form of white needles, M.P. 96.5 to 97.5° C. The rotation of a 1.2 percent solution in benzene is $[\alpha]_D^{22} = -297°$.

Example II

Using the procedure of Example I, D(+) lactide is prepared from D(−) lactic acid.

Example III

The procedure of Example I is repeated using 0.5 weight percent of tetra(2-ethylhexyl)titanate in place of the tetraisopropyltitanate. Pure L(−) lactide is obtained in substantially the same yield.

The optically active lactides prepared by the process of the present invention are useful as monomers for the prepartion of high molecular weight solid polyesters as described in U.S. Patent 2,758,987, issued August 14, 1956 to P. L. Salzberg.

I claim:
1. Process for the prepartion of substantially pure optically active lactides from optically active lactic acids, which comprises heating an optically active lactic acid at a temperature of 100° to 250° C. in the presence of 0.01 to 5 weight percent, based on the acid, of a titanium alkoxide containing up to 12 carbon atoms in the alkoxide radical and recovering an optically active lactide.
2. The process of claim 1 wherein the lactic acid is L(+) lactic acid.
3. The process of claim 1 wherein the titanium alkoxide is tetraisopropyl titanate.

References Cited
FOREIGN PATENTS
1,083,275   6/1960   Germany.

WALTER A. MODANCE, Primary Examiner.
NORMA S. MILESTONE, Assistant Examiner.